US009047329B1

(12) United States Patent
Tyson (10) Patent No.: US 9,047,329 B1
(45) Date of Patent: Jun. 2, 2015

(54) METHOD AND SYSTEM FOR AN ALGORITHM AND CIRCUIT FOR A HIGH PERFORMANCE EXACT MATCH LOOKUP FUNCTION

(75) Inventor: James Tyson, Slough (GB)

(73) Assignee: Altera Corporation, San Jose, CA (US)

( * ) Notice: Subject to any disclaimer, the term of this patent is extended or adjusted under 35 U.S.C. 154(b) by 180 days.

(21) Appl. No.: 13/458,943

(22) Filed: Apr. 27, 2012

(51) Int. Cl.
  *G06F 12/00* (2006.01)
  *G06F 9/26* (2006.01)
  *G06F 9/34* (2006.01)
  *G06F 17/30* (2006.01)
  *G06F 12/08* (2006.01)

(52) U.S. Cl.
  CPC ........ *G06F 17/3033* (2013.01); *G06F 12/0864* (2013.01)

(58) Field of Classification Search
  CPC ............ G06F 12/0864; G06F 17/3033; G06F 17/30628
  USPC .......................... 711/216, 211, 210, 206, 151; 707/999.001, 999.007
  See application file for complete search history.

(56) References Cited

U.S. PATENT DOCUMENTS

| | | | |
|---|---|---|---|
| 6,625,612 B1 * | 9/2003 | Tal et al. | 707/102 |
| 2006/0143168 A1 * | 6/2006 | Rossmann | 707/4 |
| 2006/0248095 A1 * | 11/2006 | Cozzani | 707/100 |
| 2010/0023726 A1 * | 1/2010 | Aviles | 711/216 |
| 2011/0060876 A1 * | 3/2011 | Liu | 711/108 |

OTHER PUBLICATIONS

Anna Pagha, et al., Linear Probing with Constant Independence, Jun. 11-13, 2007, ACM, STOC'07, pp. 318-327.*
U.S. Appl. No. 12/693,288, filed Jan. 25, 2010, by James Tyson, entitled "A Memory Access System."

* cited by examiner

*Primary Examiner* — Yaima Rigol
*Assistant Examiner* — Shane Woolwine
(74) *Attorney, Agent, or Firm* — Weaver Austin Villeneuve & Sampson LLP (57) ABSTRACT

In one aspect, a device is configured to provide a lookup operation for looking up a data value stored in a result table. The device includes several data tables for storing keys, or compressed representations of keys, associated with data values stored in the result table. During an example lookup operation, storage locations included within the data tables are searched for a particular key, or compressed representations of the key. If the key is found, the storage location is used to identify a memory address associated with the result table. In some implementations, the data tables are accessed in parallel to provide a lookup operation having a fixed latency. Storage locations within the data tables also are arranged to reduce the amount of memory used to implement each data table. In some implementations, the data tables are configured to use no more than one result table access per lookup operation.

26 Claims, 7 Drawing Sheets

METHOD AND SYSTEM FOR AN ALGORITHM AND CIRCUIT FOR A HIGH PERFORMANCE EXACT MATCH LOOKUP FUNCTION

TECHNICAL FIELD

The present disclosure generally relates to integrated circuits. More specifically, the present disclosure relates to techniques and systems for simulating and implementing an integrated circuit.

DESCRIPTION OF RELATED ART

A device, such as a programmable logic device (PLD) or an application specific integrated circuit (ASIC), may be a semiconductor integrated circuit that contains logic circuitry that can be designed to perform a host of logic functions. In a typical scenario, a designer uses computer-aided design (CAD) tools to design a custom logic circuit. These tools use information regarding the hardware capabilities of a given device to help the designer implement the custom logic circuit on that given device. In many instances, the device may be designed to provide a lookup operation.

When a lookup operation is performed, a first data value may be received and used as the basis of the lookup operation. In response to receiving the first data value, a second data value stored in a memory may be returned, thus completing the lookup operation. Typically, the address of the second data value must be determined in order to retrieve the data value from memory. In some conventional methods, a memory may be searched for the second data value based on the content of the first data value. However, performing such a search may require large amounts of memory and computational resources. Other conventional methods may use hash functions to reduce the amount of memory used in the lookup operation. However, such methods may be susceptible to collisions and false positives which may result in long non-deterministic latencies. Accordingly, mechanisms for performing a lookup operation are limited and hindered.

OVERVIEW

According to various embodiments, a device, such as a programmable logic device, may be configured to provide a lookup operation. In some embodiments, the lookup operation may look up a data value stored in a result table. The programmable logic device may be configured to access only one result table per lookup operation. In various embodiments, the lookup operation may have a fixed latency. In some embodiments, the device may include a plurality of data tables operable to store representations of keys associated with data values stored in the result table. The plurality of data tables may be accessed in parallel to provide a lookup operation having a fixed latency.

In various embodiments, the device may comprise a first data table implemented in a logic device, wherein the first data table includes a first plurality of storage locations arranged based on a typical distribution of hash values produced by a first hash function. In particular embodiments, the first data table is operable to store a compressed representation of a key associated with a data value stored in a memory, and further operable to return an address associated with the data value stored in the memory in response to receiving the compressed representation of the key. In various embodiments, the device may further comprise a second data table implemented in the logic device, wherein the second data table includes a second plurality of storage locations arranged based on a typical distribution of hash values produced by a second hash function. In particular embodiments, the second data table may be operable to store the key in response to the first data table having no available storage locations, or in response to the compressed representation of the key already being stored in the first data table. The second data table may be further operable to return an address associated with the data value stored in the memory in response to receiving the key, wherein the address returned by the second data table is provided as a result of a lookup operation instead of the address returned by the first data table.

In various embodiments, the apparatus may further comprise a third data table implemented in the logic device. The third data table may be operable to store a key in response to the first data table and second data table having no available storage locations, and further operable to return an address associated with the data value stored in the memory in response to receiving the key, wherein the address returned by the third data table is provided as the result of the lookup operation instead of the address returned by the first data table or the address returned by the second data table. Furthermore, according to various embodiments, the first plurality of storage locations may be arranged in a plurality of rows included in a plurality of columns, wherein the plurality of columns includes a first column and a last column, and wherein the number of rows included in a column decreases from the first column to the last column. In some embodiments, the first plurality of storage locations may be arranged in a plurality of rows included in a plurality of columns, wherein the plurality of columns includes a first column and a last column, and wherein the number of rows included in a column increases and then decreases from the first column to the last column. In particular embodiments, the compressed representation of the key and the first index are generated using a first hash function and the second index is generated using a second hash function. In various embodiments, the device may further comprise a pointer table implemented in the logic device, wherein the pointer table maps a key to a storage location included in the second data table. In particular embodiments, an output of the first data table, an output of the second data table, and an output of the third data table are coupled to an input of a multiplexer, and an output of the multiplexer is coupled to a memory. In various embodiments, the first hash function and the second hash function are the same hash function. In some embodiments, the lookup operation has a fixed latency.

In another aspect, a method may store a compressed representation of a key associated with a data value in a first data table, wherein the data value is stored in a memory, and wherein the first data table provides a plurality of storage locations arranged based on a typical distribution of hash values produced by a first hash function. In various embodiments, the method may return an address associated with the data value stored in the memory in response to receiving the compressed representation of the key at the first data table. In particular embodiments, the method may store the key in a second data table in response to the first data table having no available storage locations or in response to the compressed representation of the key already being stored in the first data table. The second data table may include a second plurality of storage locations arranged based on a typical distribution of hash values produced by a second hash function. In various embodiments, the method may return an address associated with the data value stored in the memory in response to receiving the key at the second data table, wherein the address returned by the second data table is provided as a result of a lookup operation instead of the address returned by the first data table.

In various embodiments, the method may further comprise storing the key in a third data table in response to the first data table and second data table having no available storage locations. In particular embodiments, the method may further comprise returning an address associated with the data value stored in the memory in response to receiving the key, wherein the address returned by the third data table is provided as the result of the lookup operation instead of the address returned by the first data table or the address returned by the second data table. In particular embodiments, the method may further comprise using the first hash function to generate the compressed representation of the key and the first index and using the second hash function to generate the second index. In some embodiments, the method may further comprise providing an output of the first data table, an output of the second data table, and an output of the third data table to an input of a multiplexer and providing an output of the multiplexer to the memory. In particular embodiments, the method may further comprise providing a pointer table operable to map a key to a storage location included in the second data table.

In another aspect, a non-transitory computer readable storage medium may have computer code embodied therein, the computer readable storage medium comprising computer code for storing a compressed representation of a key associated with a data value in a first data table, wherein the data value is stored in a memory, and wherein the first data table provides a plurality of storage locations arranged based on a typical distribution of hash values produced by a first hash function. In various embodiments, the computer readable storage medium may further comprise computer code for returning an address associated with the data value stored in the memory in response to receiving the compressed representation of the key at the first data table, and computer code for storing the key in a second data table in response to the first data table having no available storage locations or in response to the compressed representation of the key already being stored in the first data table, wherein the second data table includes a second plurality of storage locations arranged based on a typical distribution of hash values produced by a second hash function. The computer readable storage medium may further comprise computer code for returning an address associated with the data value stored in the memory in response to receiving the key at the second data table, wherein the address returned by the second data table is provided as a result of a lookup operation instead of the address returned by the first data table.

DESCRIPTION OF PARTICULAR EMBODIMENTS

Reference will now be made in detail to embodiments of the present invention. Examples of these embodiments are illustrated in the accompanying drawings. While the invention is described in conjunction with these embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular types of devices. However, it should be noted that the techniques and mechanisms of the present invention apply to a variety of different types of devices. In the following description, numerous specific details are set forth in order to provide a thorough understanding of the present invention. Particular exemplary embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that various embodiments may include multiple iterations of a technique or multiple instantiations of a mechanism unless noted otherwise. For example, a system may use a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to a memory component, but it will be appreciated that a variety of bridges and controllers may reside between the processor and memory. Consequently, a connection does not necessarily mean a direct, unimpeded connection unless otherwise noted.

Conventional methods of performing a lookup operation may require a large amount of memory because data values used as the basis of the lookup operation may be large. In some conventional methods, a content addressable memory may be used to perform a lookup operation. A content addressable memory may receive a first data value and search a memory for the first data value to identify a second data value. For example, in an Ethernet switch, a data packet may be received. The data packet may include a destination address. A content addressable memory may be used to map the destination address to an output port of the switch. Thus, the first data value may be the destination address. The first data value may be provided to the content addressable memory and used to lookup a second data value that identifies an output port. While a content addressable memory may be used, a content addressable memory may require a specialized type of memory that is more expensive and requires more power. Thus, conventional methods utilizing content addressable memory may result in systems that cost more and are less flexible.

Other conventional methods may use hash functions to reduce the size of a first value used as the basis of a lookup operation. For example, a hash function may be applied to a first data value, such as a key, to generate a hash value. The hash value may then be used as the basis of a lookup operation. However, because a hash function maps a first data set to a second data set that is smaller than the first data set, multiple data values may be hashed to the same hash value. Because multiple input values may be hashed to the same hash value, collisions may occur during a lookup operation. A collision may occur when two or more keys are hashed to the same hash value. In the event of a collision, conventional methods may scan the entire memory for the correct data value. Such scanning results in long and nondeterministic latencies.

In various embodiments, a lookup function is provided that has a fixed latency and is memory efficient. A computer processor may be used to generate keys. The keys may be provided to a plurality of data tables that are coupled in parallel to a result table. In various embodiments, a first data table may store compressed representations of keys generated by a first hash function. Storing compressed representations of keys instead of the entire value of the keys results in reduced memory utilization. The compressed representations of the keys may be stored in storage locations identified by indexes also generated by the first hash function. The storage locations may be arranged based on a typical distribution of hash values generated by the first hash function. The typical or normal distribution of the hash function may heavily load some indexes, while lightly loading other indexes. Thus, according to various embodiments, the storage locations may be arranged so that storage locations may be shared by indexes that have different probabilities of being generated. For example, the number of storage locations included in a column may decrease towards a particular side of a data table. Columns that have fewer storage locations may map multiple indexes to each storage location. Arranging storage locations in this way enables a higher utilization of the storage locations (or memory) by accounting for a probability of collisions that may occur as a result of the typical distribution of the first hash function. In some embodiments, a second data table may be used to store keys that their compressed representations cannot be stored in the first data table. This may occur when the first data table already stores compressed representation of the keys at a particular index values, or when the first data table is full. Keys may also be stored in storage locations included in the second data table. The storage locations may be identified by indexes generated by a second hash function.

The storage locations within the second data table may be arranged based on a typical distribution of hash values generated by the second hash function. In various embodiments, a typical distribution may refer to a normal mathematical distribution of hash values produced by the second hash function. In various embodiments, a third data table may be used to store keys that cannot be stored in the second data table or keys where their compressed representations cannot be stored in the first data table. The outputs of the first, second, and third data table may be coupled to a result table via a multiplexer. Thus, according to various embodiments, when a lookup operation is performed, one or more keys may be provided to each data table and used to search each data table for a matching stored value. If a matching value is found in a data table, the data table may return an address based on the identity of the storage location that stores the key. If addresses are returned from more than one data table, the multiplexer may determine which address is provided to the result table based on a priority between the first, second, and third data tables. Because the first, second, and third data tables are searched in parallel to provide an address, the lookup operation has a fixed latency. Furthermore, because some data tables utilize a hash function while some do not, occurrences of irresolvable collisions may be reduced without utilizing a large amount of memory.

In one example, the plurality of data tables may be included in a network router or switch. Thus, a lookup operation may be requested for a particular internet protocol (IP) routing application. For example, destination media access control (MAC) addresses may be stored in a result table of a memory. Each destination MAC address may have an associated key that is also stored in the result table. In various embodiments, the key may be an IP address. In some embodiments, one or more keys may be received by the plurality of data tables included in the network router. For each received key, a first data table, second data table, and third data table may be searched for a location in the result table that may correspond to the key. If found, a memory address may be identified and returned based on the location corresponding to the key. The returned memory address may be used to look up the destination MAC address stored in the result table of the memory. The destination MAC address may be returned as the result of the lookup operation and used to route data for the IP routing application.

Figure 1:
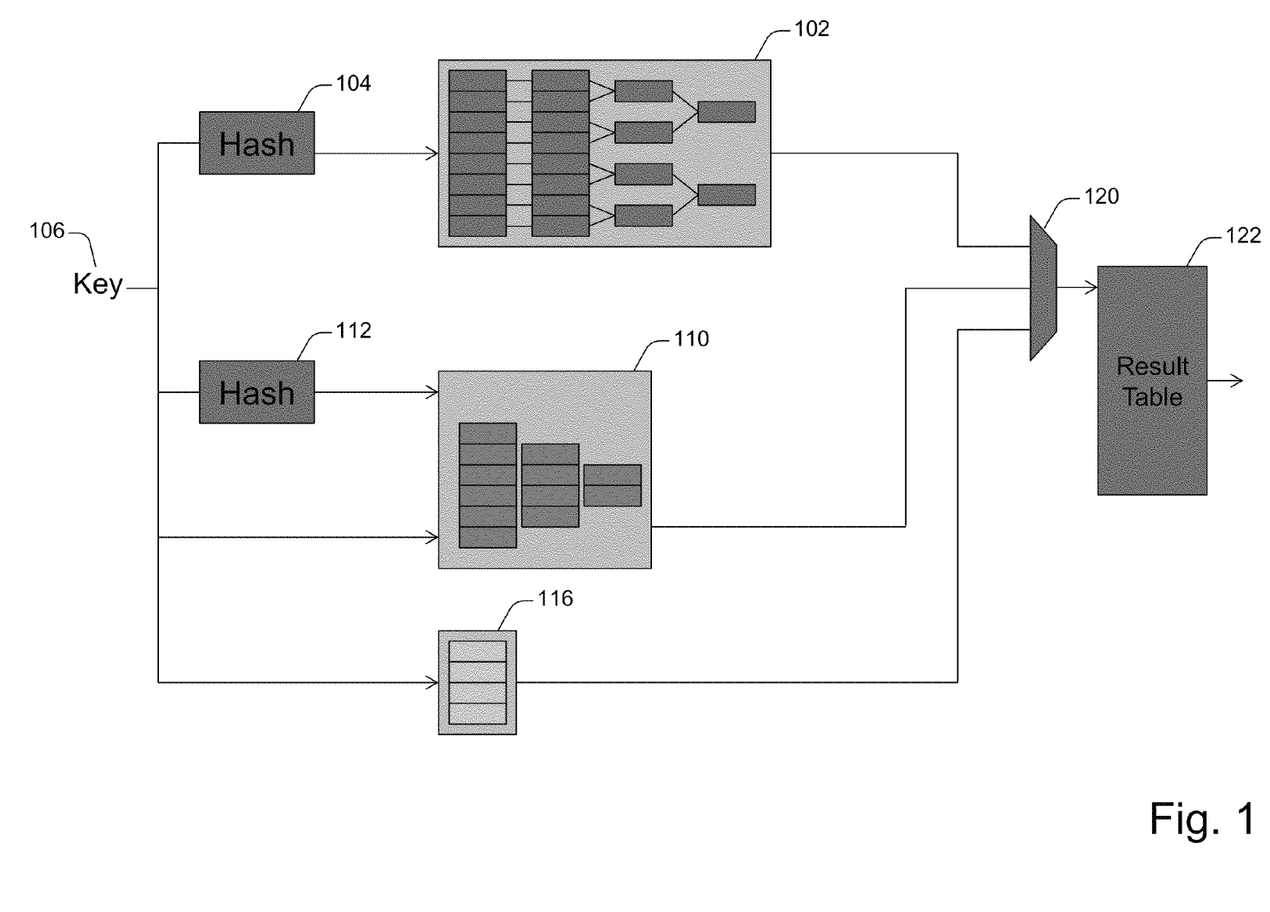
FIG. 1 illustrates an exemplary arrangement of a plurality of data tables capable of providing addresses for a lookup operation, implemented in accordance with some embodiments.

FIG. 1 illustrates an exemplary arrangement of a plurality of data tables capable of providing addresses for a lookup operation, implemented in accordance with some embodiments. In various embodiments, the plurality of data tables may include first data table 102, second data table 110, and third data table 116. First data table 102, second data table 110, and third data table 116 may be used to store keys or compressed representations of keys associated with data values stored in result table 122. The keys may be stored such that during a lookup operation, a looked up key may identify a memory address included in result table 122. In various embodiments, the plurality of data tables may be searched in parallel and at approximately the same time during the lookup operation. Because a hardware implementation of the plurality of data tables also allows storage locations within the plurality of data tables to be searched in parallel (for example multiple columns of storage locations within a data table may be searched at the same time), all searching occurs concurrently and at approximately the same time, and a result may be provided within a predictable period of time. In some embodiments, the plurality of data tables are not searched in parallel, but instead searched sequentially. While a sequential search of the plurality of data tables may take longer than a parallel search because each storage location is checked individually in sequential order, a sequential search of all storage locations may be performed within a predictable period of time and may also have a fixed latency. Thus, according to various embodiments, the lookup operation may have a fixed latency.

In some embodiments, hash function 104 performs a hash operation on one or more keys, such as key 106. Hash function 104 may be a CRC32, CRC32C, FNV, Jenkins, Murmur, or Toeplitz function, or any other suitable function that may be appreciated by one of skill in the art. Furthermore, hash function 104 need not be a hash function. Any mathematical function capable of mapping a given input to a single output may be used. In various embodiments, hash function 104 may generate both a compressed representation of key 106 and an index associated with key 106. In some embodiments, the compressed representation of key 106 may be generated by applying a hash function to key 106. Storing a compressed representation of key 106 instead of the entire value of key 106 may use less memory because the compressed representation of key 106 is smaller than the entire value of key 106. For example, a key that may be a 64 bit number may be compressed to an 8 bit number. Thus, the 8 bit number may be a compressed representation of the 64 bit number. Furthermore, compressing keys may allow first data table 102 to store values representing larger keys with larger bit numbers without increasing the amount of memory used by first data table 102 because the compressed representations of those numbers remain the same size.

In various embodiments, hash function 104 may comprise two separate hash algorithms; one to generate compressed representations of keys, such as key 106, and another to generate indexes associated with the keys. The compressed representations of the keys and the indexes may be provided to first data table 102 to insert or store the compressed representations of the keys in first data table 102.

In various embodiments, first data table 102 may include a plurality of columns of storage locations. In some embodiments a storage location may refer to a unit of memory, such as a random access memory (RAM) cell or a register, that may be used as a "bucket" capable of storing at least one data value. In particular embodiments, each column may comprise an array of storage locations. Thus, first data table 102 may include a plurality of arrays of storage locations. Each array of storage locations may have an associated array of indexes capable of providing addressing that identifies storage locations within the array. For example, an index may represent an address pointing to a specific storage location within an array of storage locations. Furthermore, each storage location may be mapped to a storage location in result table 122. This mapping may be accomplished through hardware addressing implemented in hardware, such as a programmable logic device. For example, an index may identify a first storage location included in a first column of first data table 102. The first storage location may be mapped to a first storage location of a first column in result table 122. The mapping may be a predetermined relationship between first data table 102 and result table 122.

Figure 2A:
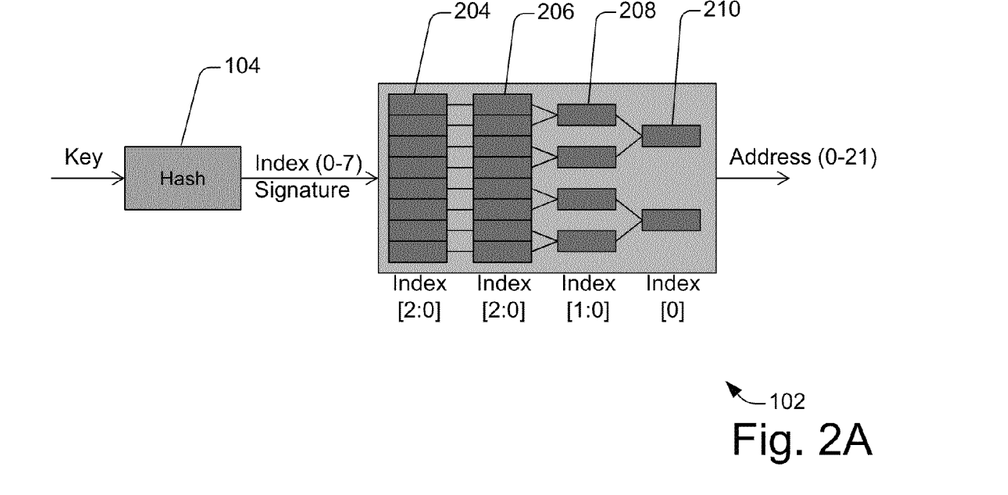
FIG. 2A illustrates an exemplary arrangement of storage locations that are addressed by arrays of indexes in accordance with one embodiment.
Figure 2B:
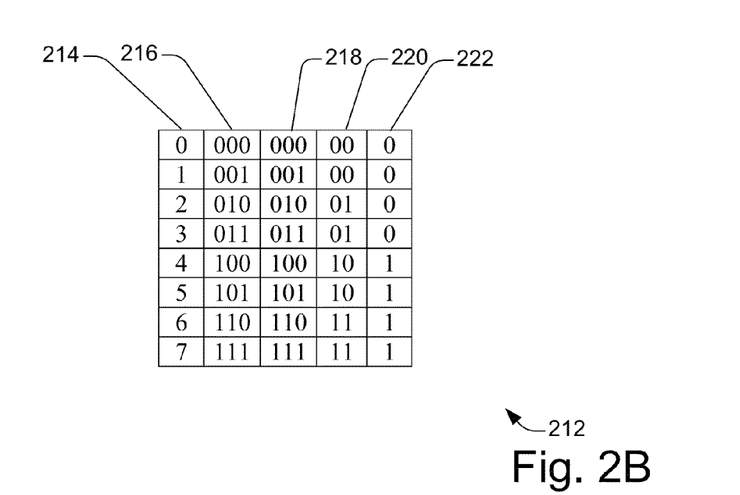
FIG. 2B illustrates exemplary arrays of indexes that may be used to address an arrangement of storage locations in accordance with one embodiment.

FIG. 2A illustrates an exemplary arrangement of storage locations that are addressed by arrays of indexes in accordance with one embodiment. First data table 102 may include arrays of storage locations, such as array 204, array 206, array 208 and array 210. Array 204 may have an associated array of indexes pointing to storage locations included in array 204. The array of indexes may be an array of numbers, such as binary numbers. Each number within the array of indexes may be associated with a storage location of array 204. FIG. 2B illustrates exemplary arrays of indexes that may be used to address an arrangement of storage locations in accordance with one embodiment. In various embodiments, table 212 represents various indexing schemes which may be used to index storage locations in array 204, array 206, array 208, and array 210. Thus, according to various embodiments, one or more arrays of indexes shown in table 212 may be used to index storage locations included in arrays of storage locations, such as array 204, array 206, array 208, and array 210 which may be included in first data table 102. For example, array of indexes 214 may be depicted as indexes 0-7 that correspond to eight storage locations included in array 204. In various embodiments, array of indexes 214 may be represented as binary numbers. Thus, instead of values of 0-7, values identified by array of indexes 216 may be used. Therefore, array of indexes 216 may include binary numbers pointing to and identifying storage locations in array 204. Thus, an index of "0" may be represented by the binary number "000" and identify the storage location in the first row of array 204. The same may be true for array of indexes 218, array of indexes 220, and array of indexes 222 with respect to array 206, array 208, and array 210.

Returning to FIG. 2A, in various embodiments, the plurality of storage locations included in first data table 102 may be arranged based on a distribution of collisions produced by hash function 104. In various embodiments, hash function 104 may generate indexes associated with keys, such as key 106. As will be appreciated by one of skill in the art, hash function 104 may operate in accordance with a mathematical distribution. For example, by virtue of the operation of the hash function, each output of the hash function may have an associated probability of being generated. Because hash function 104 may generate indexes in accordance with a mathematical distribution of probabilities, some indexes may be more likely to be generated than others. Thus, some indexes may be more prone to and have a higher incidence of collisions than other indexes. Accordingly, the plurality of storage locations may be arranged so that storage locations may be shared by indexes that have different probabilities of being generated. Such arrangement of the plurality of storage locations efficiently arranges the storage locations to reduce the number of storage locations that are unused or unoccupied.

In various embodiments, the plurality of storage locations may be arranged in a converging scheme in which the number of storage locations included in a column decreases towards a particular side of first data table 102. For example, first data table 102 may include a first column of storage locations, such as array 204, and a last column of storage locations, such as array 210. In various embodiments, the number of storage locations included in a column may decrease from the first column of storage locations to the last column of storage locations. Accordingly, arrays 204 and 206 may include eight storage locations while array 208 includes four storage locations and array 210 includes two storage locations. The addresses for arrays 208 and 210 may be determined by dropping a bit from the binary numbers used as indexes for each respective array. For example, arrays 204 and 206 may have associated indexes for all eight storage locations included within each array, as shown by arrays 214 and 216 of FIG. 2B. However, for array 208, the least significant bit may be dropped from the index, as shown by array 220 of FIG. 2B. This results in four different binary numbers. Thus, dropping a bit from the index may map the eight indexes originally produced by hash function 104 to the four storage locations of array 208. Furthermore, an additional least significant bit may be dropped, as shown by array 222 of FIG. 2B. This results in two different binary numbers which may map the eight indexes originally produced by hash function 104 to the two storage locations of array 210.

Figure 2C:
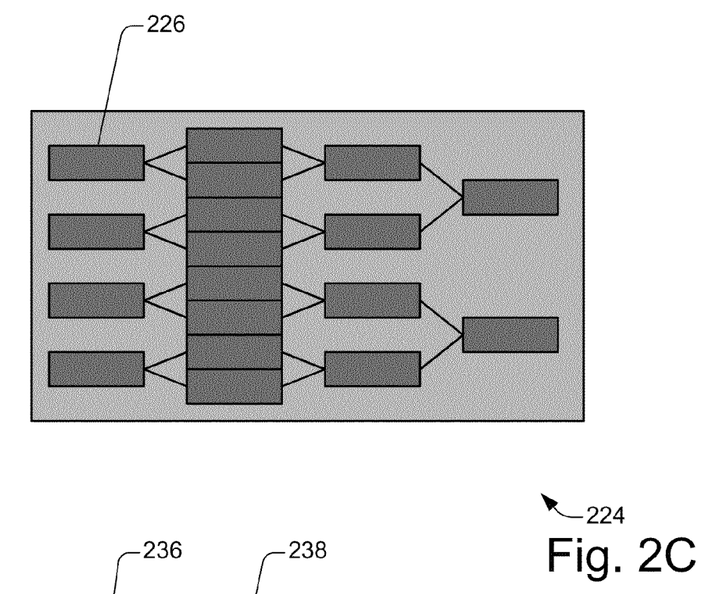
FIG. 2C illustrates an exemplary arrangement scheme of storage locations where the number of storage locations included in a column increases before decreasing towards a particular side of a data table in accordance with one embodiment.

FIG. 2C illustrates an exemplary arrangement scheme of storage locations where the number of storage locations included in a column increases before decreasing towards a particular side of a data table in accordance with one embodiment. Reducing the number of storage locations in a first column, such as array 226, may further reduce the amount of memory used by the lookup operation.

Returning to FIG. 1, one or more keys, such as key 106, may be provided to hash function 112. In various embodiments, hash function 112 performs a hash operation on the one or more keys to generate one or more indexes associated with the one or more keys. The one or more indexes and keys are provided to second data table 110. Second data table 110 may include a plurality of storage locations. As discussed with reference to first data table 102, second data table 110 may include a plurality of columns of storage locations that may be a plurality of arrays of storage locations. The plurality of storage locations may be arranged based on a distribution produced by hash function 112. For example, the plurality of storage locations included in second data table 110 may be arranged in a converging scheme in which the number of storage locations included in a column may decrease from a first column of storage locations to a last column of storage locations. In various embodiments, hash function 104 and hash function 112 are different hash functions. If different, hash function 104 and hash function 112 are less likely to be susceptible to the same mathematical distribution, and less likely to be susceptible to the same collisions. Thus, having different hash functions increases the likelihood of storing of a data value during a storage method.

Figure 2D:
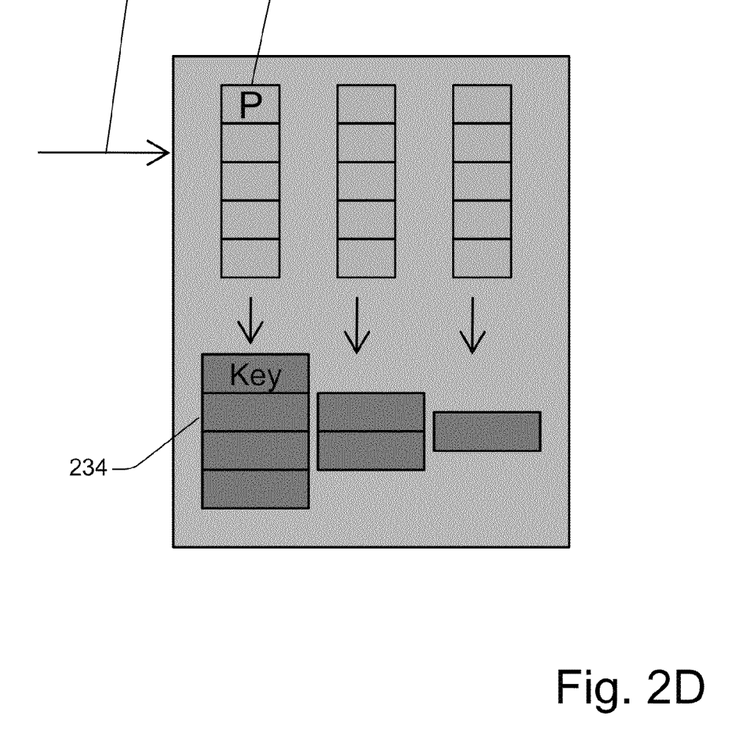
FIG. 2D illustrates an exemplary arrangement scheme of a data table using pointer table to identify storage locations in the data table instead of a hash function in accordance with one embodiment.

FIG. 2D illustrates an exemplary arrangement scheme of a data table using a pointer table to identify storage locations in the data table instead of a hash function in accordance with one embodiment. In various embodiments, implementation of a pointer scheme may allow multiple data tables of different sizes to be addressed based on one set of indexes. In various embodiments, key 236 may be received at pointer table 238. In various embodiments, pointer table 238 may include a plurality of storage locations that store pointers. A pointer may associate a key with a storage location included in second data table 234. In various embodiments, the storage locations included in pointer table 238 may be addressed by using a subset of the indexes generated for first data table 102. Furthermore, the storage locations in pointer table 238 may be arranged in a converging scheme, as similarly discussed before with reference to first data table 102. If pointer data table 238 stores a pointer that matches key 236, the location of the matching value may point to a storage location included in second data table 234 based on a predetermined mapping scheme. Thus, pointer table 238 may be used to address storage locations included in second data table 234 instead of a second hash function.

Returning to FIG. 1, third data table 116 may receive one or more keys, such as key 106. In various embodiments, no additional hashing is performed. Thus, third data table 116 receives the one or more keys without any further hashing or compression. In various embodiments, third data table 116 includes a plurality of storage locations which may store the entire value of a key. Thus, in some embodiments, third data table 116 may operate as content addressable memory. In various embodiments, because third data table 116 does not utilize additional hashing, the output of third data table 116 is not susceptible to false positives that may be generated by a hash function and is more reliable than the output of first data table 102 and second data table 110.

In various embodiments, the output of first data table 102, second data table 110, and third data table 116 are coupled to an input of multiplexer 120. A control signal may determine the output of the multiplexer. The control signal may be determined based on a priority between the plurality of data tables. In various embodiments, the data table with the most reliable output and lowest rate of false positives is given highest priority. For example, third data table 116 may be given highest priority because out of the three data tables illustrated in FIG. 1, third data table 116 is least likely to generate a false positive. Accordingly, if third data table 116 returns a match during a lookup operation, third data table will have priority over first data table 102 and second data table 110. Accordingly, multiplexer 120 will output the result returned by third data table 116. Similarly, second data table 110 may have priority over first data table 102. Accordingly, multiplexer 120 may output a result returned by second data table 110 instead of first data table 102. In various embodiments, the output of multiplexer 120 is coupled to an input of result table 122 to provide the result returned by the plurality of data tables to result table 122.

In various embodiments, result table 122 may be a data table included in a memory, such as random access memory (RAM) of a processing system. In various embodiments, result table 122 stores a plurality of data values associated with a plurality of keys. For example, a data value, such as a destination MAC address, may be stored in a storage location within result table 122. Furthermore, a key associated with the destination MAC address may also be stored in the same storage location. In some implementations, the key may be an IP address associated with the destination MAC address. In particular embodiments, result table 122 may receive one or more keys and one or more memory addresses provided by the output of multiplexer 120. Each memory address may correspond to a memory address of a memory included in result table 122. Accordingly, result table 122 may look up one or more data values and one or more keys based on the one or more received memory addresses. Result table 122 may then return one or more looked up data values at an output as one or more results of a lookup operation.

In some embodiments, result table 122 may be included in a RAM that has multiple ports allowing for multiple lookup operations to be performed concurrently. For example, a dual-port RAM may have two input ports that allow for two lookups of result table 122 to be performed concurrently. Thus, a dual-port RAM may be coupled to two pluralities of data tables used to perform two separate and concurrent lookup operations. It will be appreciated that the same may be true for RAM with more than two ports, such as a three or four port RAM providing three or four concurrent lookup operations. In various embodiments, the same may be true for any of the data tables included in the plurality of data tables. For example, first data table 102 may be included in a RAM that has multiple ports allowing for multiple lookup operations to be performed concurrently. In various embodiments, the same may be true for second data table 110 and third data table 116.

While various embodiments have described the use of first data table 102, second data table 110, and third data table 116, it will be appreciated that any combination of data tables may be used. For example, the plurality of data tables may include only the first data table 102 and the third data table 116. In another example, the plurality of data tables may include only the second data table 110 and the third data table 116. Accordingly, the exemplary arrangement of data tables described by FIG. 1 may include any combination of a group consisting of first data table 102, second data table 110, and third data table 116.

Figure 3:
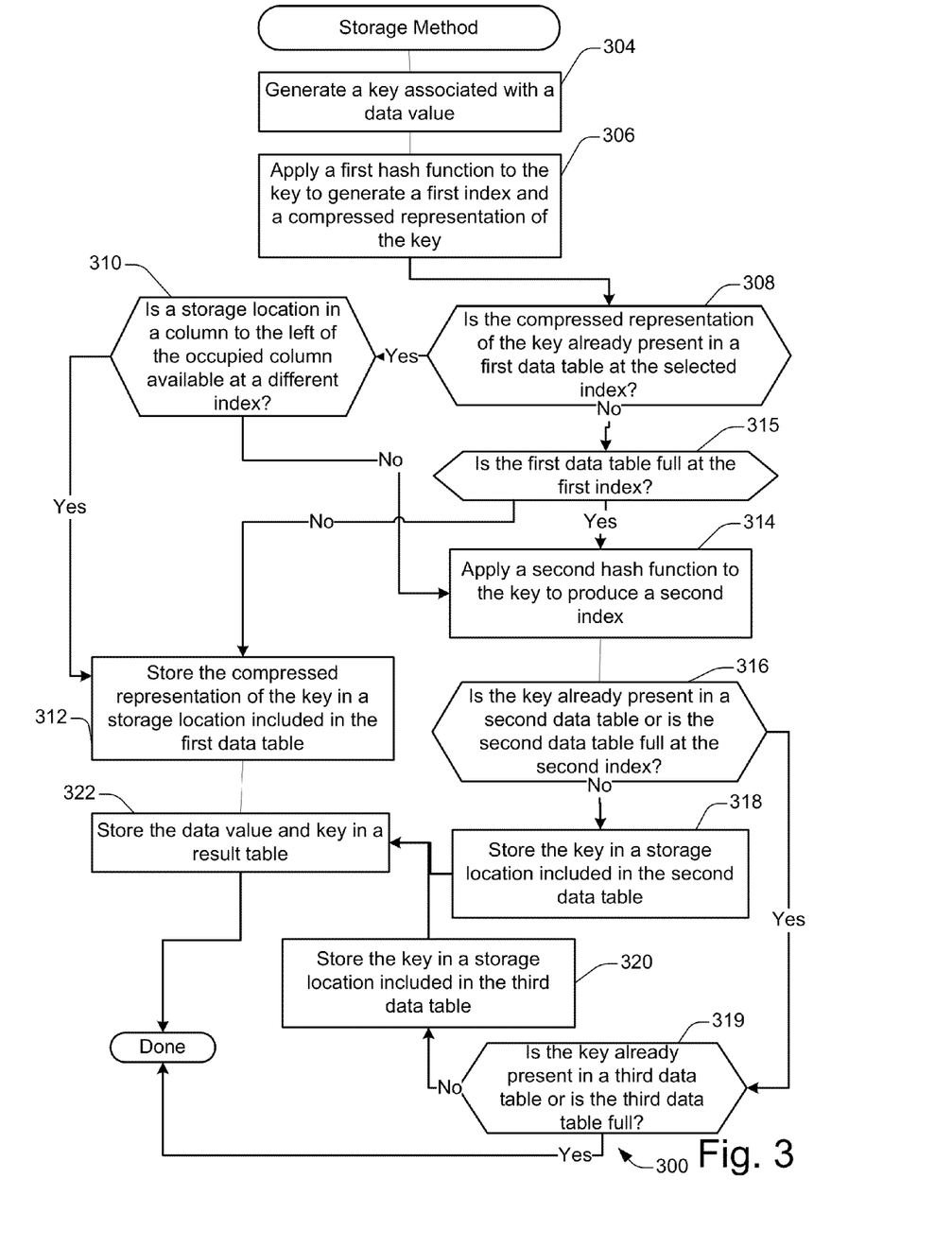
FIG. 3 illustrates an exemplary key storage method for inserting a key into a data table during a lookup operation in accordance with some embodiments.

FIG. 3 illustrates an exemplary key storage method for inserting a key into a data table during a lookup operation in accordance with some embodiments. In various embodiments, storage method 300 may load keys, or compressed representations of keys, into data tables such that the data tables may return one or more memory addresses in response to receiving one or more keys.

At step 304, one or more keys may be generated. According to some embodiments, a processor, such as a processor implemented on a programmable logic device, may be used to generate each key. In various embodiments, a key may have a first data value and be associated with an IP address. The key may be associated with a second data value, such as a destination MAC address.

At step 306, a first hash function may be applied to one or more keys to generate one or more indexes to generate a compressed representation of each key. In various embodiments, the one or more indexes may include a first index that identifies a storage location within an array of storage locations at which a compressed representation of a key should be stored. In various embodiments, storage method 300 may use a different algorithm or hash function than the algorithm or hash function used to generate the one or more indexes. Thus, a second hash function or compression algorithm may be used to generate the one or more compressed representations.

At step 308, it may be determined whether or not one or more compressed representations of the one or more keys are already present in a first data table at one or more indexes, such as the first index. In various embodiments, a compressed representation of a key may already be present in the first data table if the compressed representation of the key was stored during a previous storage method. In such a situation, storing the compressed representation of the key in the first data table may be omitted to avoid redundant storage of data values. In some embodiments, the compressed representation of the key may already be present in the first data table if it was inserted for a different key that was hashed to the same hash value, as would be the case with a collision. In such a situation, storing the compressed representation of the key may be omitted to avoid a non-deterministic lookup operation that would occur as a result of a false positive caused by the collision. As previously discussed with reference to FIG. 1, first data table 102, the first data table may include a plurality of columns of storage locations. Each column may be an array of storage locations addressed by indexes generated by the first hash function. Thus, in various embodiments, the plurality of columns, or arrays, of storage locations included in the first data table may be accessed in parallel, and storage locations associated with the first index may be checked for each array concurrently.

If a compressed representation of the key is already stored in a storage location of a column included in the first data table because a different key has been hashed to the same compressed representation, storage method 300 may check additional columns to see if other storage locations are available at the first index. Checking additional columns at the first index may verify whether or not the compressed representation of the key is already stored at the first index. This may be appropriate when information about indexes associated with stored values, such as a bit, has been dropped in order to map multiple indexes to a single storage location. As discussed above with reference to FIG. 2A and FIG. 2B, an example of such mapping may be when a converging scheme of storage locations is used to reduce the amount of memory used in a data table. Because multiple indexes are mapped to a single storage location, two values having different indexes may both be mapped to a single storage location. Therefore, a value stored in the single storage location that returns a match may actually have an index that is different than the first index, such as a second index, that was mapped to the same storage location when a least significant bit was dropped from the second index. If the first index and the second index are the same, then the compressed representation of the key is already stored in the first data table at the first index and need not be stored again. Accordingly, storage method 300 may proceed to step 314. However, if the second index associated with the stored value is different than the first index associated with the received key, additional storage locations in other columns may be checked to determine if an additional storage location is available and capable of storing the compressed representation of the key at the first index.

Accordingly, at step 310, it may be determined whether or not a storage location in a column to the left of the occupied column is available at a different index. If a storage location is available, storage method 300 may proceed to step 312 and store the compressed representation of the key in the available storage location. If a storage location is not available, storage method 300 may proceed to step 314 to store the key in a second data table or a third data table.

At step 308, if it is determined that one or more compressed representations of the one or more keys are not present in the first data table at the first index, it may be further determined at step 315 whether or not the first data table is full at one or more indexes, such as the first index. In various embodiments, determining the first data table is full at the first index may identify a situation in which the first data table does not store a compressed representation of a key at the first index, but has no available storage locations at the first index because all storage locations at the first index are already occupied by other previously stored values. Accordingly, if at step 315 it is determined that a storage location is available at the first index, storage method 300 may proceed to step 312 and store the compressed representation of the key in the available storage location. However, if a storage location is not available, storage method 300 may proceed to step 314 to store the key in a second data table or a third data table.

At step 314, a second hash function may be applied to one or more keys to produce one or more indexes, such as a second index. Similar to step 306, the second hash function may generate a second index associated with an array of storage locations that may store a key. At step 316, it may be determined whether or not the key is already present in a second data table or whether or not the second data table is full at the second index. In various embodiments, the second data table may be full at the second index when the second data table already stores a data value at the second index. Thus, a plurality of columns of storage locations included in the second data table may be accessed and checked at the second index. If it is determined that the key is not present in the second data table and the second data table is not full, then storage method 300 may proceed to step 318.

At step 318, one or more keys may be stored in a storage location included in the second data table. Thus, an entire key, as opposed to a compressed representation of the key, may be stored in the second data table in response to determining that the key is not already stored in the second data table and that a storage location is available. In various embodiments, if the one or more keys are stored in the second data table, storage method 300 may proceed to step 322. As previously discussed, at step 322, the one or more keys and their associated data value(s) may be stored in the result table.

At step 316, if it is determined that one or more keys are present in the second data table or the second data table is full at the second index, then storage method 300 may proceed to step 319. At step 319 it may be determined whether or not one or more keys are already present in a third data table or whether or not the third data table is full. Thus, storage locations included in the third data table may be accessed and checked. If it is determined that the one or more keys are not present in the third data table and the third data table is not full, storage method may proceed to step 320.

At step 320, one or more keys may be stored in one or more storage locations included in a third data table. In various embodiments, an entire value of a key may be stored without an additional application of a hash function. Because no additional hash function is used, the full value of the key may be used as the basis of identifying the storage location that stores the key. After storing the one or more keys in the third data table, storage method 300 may proceed to step 322. At step 322, the one or more keys and their associated data value(s) may be stored in the result table.

At step 319, if it is determined that one or more keys are present in the third data table or the third data table is full, then storage method 300 may proceed to drop the one or more keys and not insert the key(s) in any data table. As similarly discussed above, in various embodiments, the third data table may be full when the third data table has no available storage locations.

Figure 4:
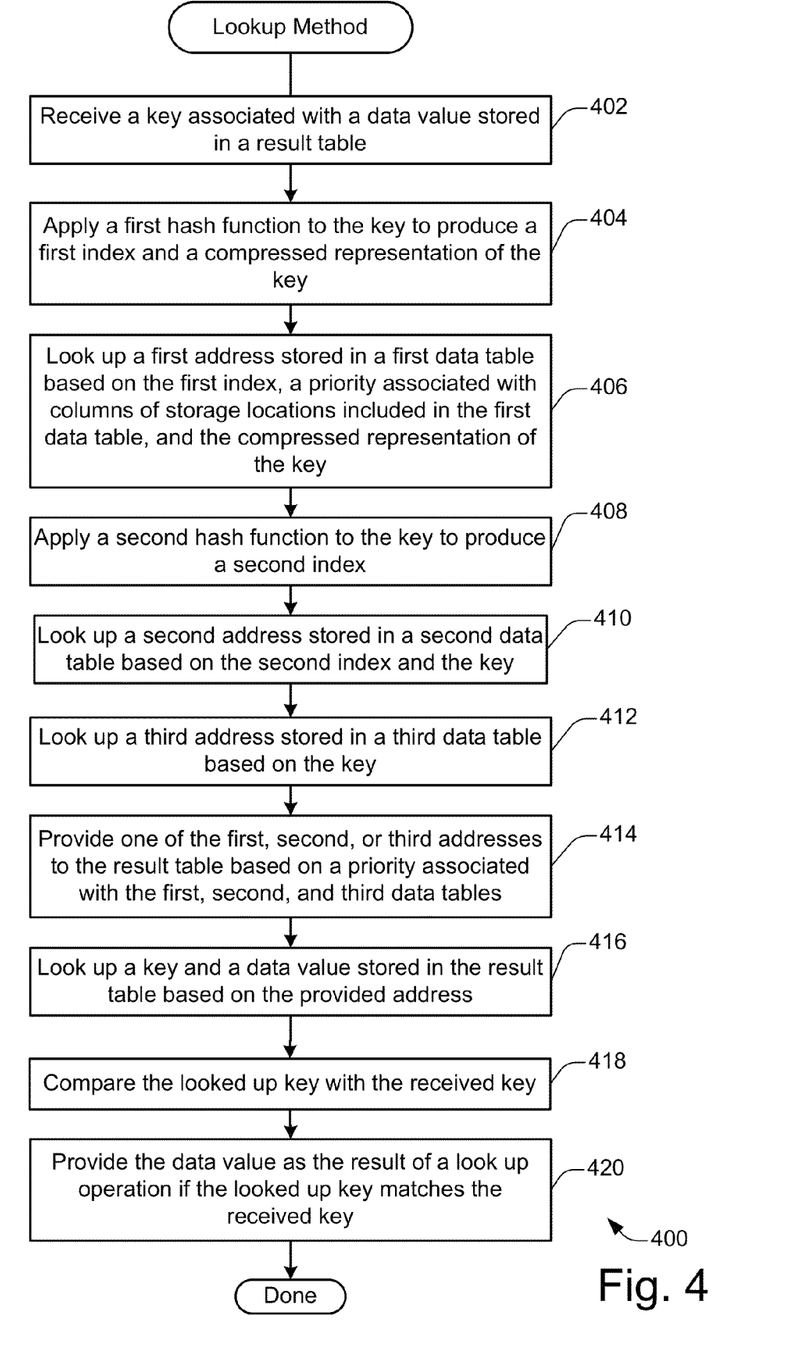
FIG. 4 illustrates an exemplary lookup method to perform a lookup operation using a data value in accordance with some embodiments.

FIG. 4 illustrates an exemplary lookup method to perform a lookup operation using a data value in accordance with some embodiments. In various embodiments, lookup method 400 may be a lookup operation performed during a routing application performed by a network router or switch. For example, one or more IP addresses may be received. In various embodiments, an IP address may be received with a data packet at a network router. In response to receiving the one or more IP addresses, a first, second, and third data table may be used to lookup one or more destination MAC addresses that may be used to route data packets associated with the IP addresses.

At step 402, one or more keys may be received. In various embodiments, a key may be an IP address associated with a destination MAC address stored in a result table. At step 404, a first hash function may be applied to the one or more keys to produce one or more indexes, such as a first index, and one or more compressed representations.

At step 406, a first address may be looked up based on the one or more indexes, such as the first index, a priority associated with columns of storage locations included in the first data table, and the one or more compressed representations. For example, the first index may identify a storage location within each column of storage locations included in the first data table. A storage location from a specific column may be identified based on a predetermined priority among the columns included in the first data table. For example, a matching value stored in a column farthest to the left of the data table may have the highest priority because it is the most reliably indexed. As previously discussed, each storage location included in a data table may be mapped to a memory address of the result table. Therefore, if a storage location includes a matching value, the first address may be determined based on the memory address that the storage location is mapped to.

At step 408, a second hash function may be applied to the one or more keys to produce one or more indexes, such as a second index. At step 410, a second address may be identified based on the second index and the key. More specifically, the second address may be determined based on which storage location includes a matching key. For example, columns of storage locations included in the second data table may be checked based on the second index. If a storage location includes a matching value, the second address may be determined based on the memory address that the storage location is mapped to.

At step 412, a third address may be identified based on the one or more keys. In various embodiments, storage locations included in the third data table may be checked based on the one or more keys. If a storage location includes a matching value, the third memory address may be determined based on the memory address that the storage location is mapped to.

At step 414, one of the first, second, or third addresses may be provided to the result table based on a priority associated with the first, second, and third data tables. In various embodiments, priority is determined based on which data table produces the most reliable results and generates the fewest false positives. Of the three data tables, the third data table uses the least data compression when storing data values because the third data table does not utilize an additional hash function, and uses the full value of the key as the basis of identifying a memory address. Therefore, because the third data table uses the least data compression when storing data values, the third data table is less likely to generate a false positive during a lookup operation than the first data table or the second data table. Thus, according to various embodiments, the third data table is given the highest priority, and its output will be provided to the result table instead of either the second or first data tables. The second data table uses one application of a hash function, and is more reliable than the first data table, which uses two applications of a hash function. Thus, the second data table has higher priority than the first data table, and its output will be provided to the result table instead of the first data table. Accordingly, at step 414, a multiplexer may multiplex the outputs of the first, second, and third data tables based on a priority to provide an output to the result table.

At step 416, one or more keys and data values stored in the result table may be looked up based on one or more provided addresses. Thus, a provided address may identify a specific storage location in a memory included in the result table. The storage location may contain the data value that was originally stored as part of a storage method. Moreover, the key associated with the data value may be stored in the same storage location and returned as part of the lookup operation.

At step 418, the one or more looked up keys retrieved from the result table may be compared with the one or more received keys that were received at step 402. In various embodiments, comparing a looked up key to a received key provides a parity check. If the looked up key and the received key are the same, then the lookup operation was successful and the correct data value has been retrieved. However, if the looked up key and the received key are not the same, then the lookup operation has returned an incorrect data value due to a false positive. In various embodiments, the result of this comparison may be provided at a user interface of a computing system to provide information about the result of the lookup operation.

At step 420, the one or more looked up data values may be provided at an output of the result table. In various embodiments, a looked up data value may be provided as a result of a lookup operation in response to a looked up key matching a received key.

Figure 5:
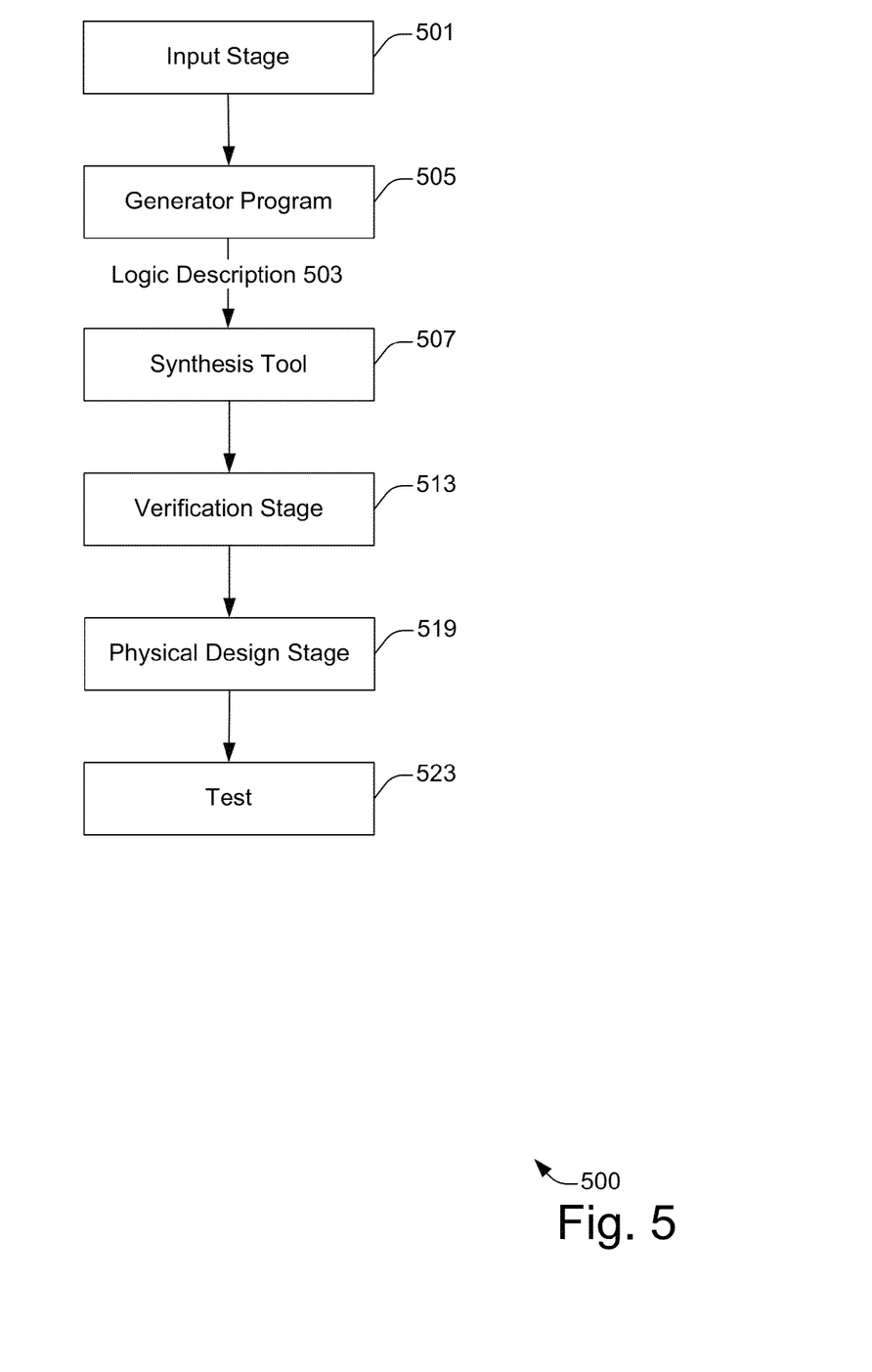
FIG. 5 illustrates an exemplary technique for implementing, on a programmable chip, data tables for performing a lookup operation in accordance with some embodiments.

FIG. 5 illustrates an exemplary technique for implementing, on a programmable chip, data tables for performing a lookup operation in accordance with some embodiments. Such a technique may be used to implement a programmable logic device (PLD), as discussed above. An input stage 501 receives selection information typically from a user for logic such as a processor core as well as other components to be implemented on an electronic device. In one example, the input received is in the form of a high-level language program. A generator program 505 creates a logic description 503 and provides the logic description along 503 with other customized logic to any of a variety of synthesis tools, place and route programs, and logic configuration tools to allow a logic description to be implemented on an electronic device.

In one example, an input stage 501 often allows selection and parameterization of components to be used on an electronic device. The input stage 501 also allows configuration of hard coded logic. In some examples, components provided to an input stage include intellectual property functions, megafunctions, and intellectual property cores. The input stage 501 may be a graphical user interface using wizards for allowing efficient or convenient entry of information. The input stage may also be a text interface or a program reading a data file such as a spreadsheet, database table, or schematic to acquire selection information. The input stage 501 produces an output containing information about the various modules selected. At this stage, the user may enter security information about individual components that needs to be isolated. For example, different levels of component security and which components are allowed to communicate with each other may be entered.

In typical embodiments, the generator program 505 can identify the selections and generate a logic description with information for implementing the various modules. The generator program 505 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 505 identifies pointers and provides ports for each pointer. One tool with generator program capabilities is System on a Programmable Chip (SOPC) Builder available from Altera Corporation of San Jose, Calif. The generator program 505 also provides information to a synthesis tool 507 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 501, generator program 505, and synthesis tool 507 can be separate programs. The interface between the separate programs can be a database file, a log, or simply messages transmitted between the programs. For example, instead of writing a file to storage, the input stage 501 can send messages directly to the generator program 505 to allow the generator program to create a logic description. Similarly, the generator program can provide information directly to the synthesis tool instead of writing HDL files. Similarly, input stage 501, generator program 505, and synthesis tool 507 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 507.

A synthesis tool 507 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 513 typically follows the synthesis stage 507. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 513, the synthesized netlist file can be provided to physical design tools 519 including place and route and configuration tools. A place and route tool locates logic cells on specific logic elements of a target hardware device and connects wires between the inputs and outputs of the various logic elements in accordance with logic and security provided to implement an electronic design. According to various embodiments of the present invention, the place and route tool may perform the techniques of the present invention to implement the various security requirements and rules as defined by the user. The iterative technique may be transparent to the user, but the resulting device can be physically tested at 523.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 501, the generator program 505, the synthesis tool 507, the verification tools 513, and physical design tools 519 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 6:
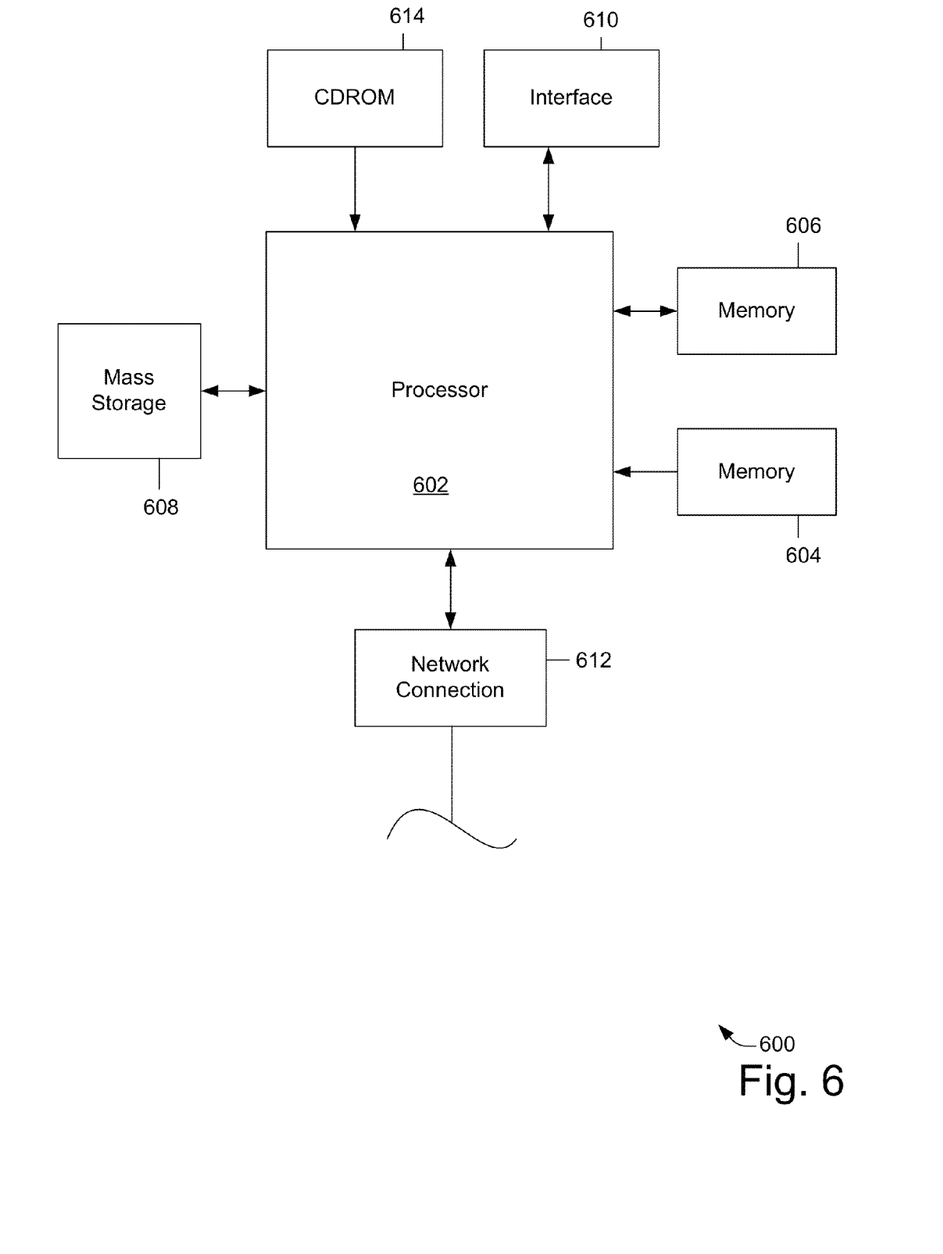
FIG. 6 illustrates one example of a computer system according to some embodiments.

FIG. 6 illustrates one example of a computer system according to some embodiments. The computer system 600 includes any number of processors 602 (also referred to as central processing units, or CPUs) that are coupled to devices including memory component 606 (typically a random access memory, or "RAM"), memory component 604 (typically a read only memory, or "ROM"). The processors 602 can be configured to generate an electronic design. As is well known in the art, memory component 604 acts to transfer data and instructions uni-directionally to the CPU and memory component 606 are used typically to transfer data and instructions in a bi-directional manner.

Both of these memory devices may include any suitable type of the computer-readable media described above. A mass storage device 608 is also coupled bi-directionally to CPU 602 and provides additional data storage capacity and may include any of the computer-readable media described above. The mass storage device 608 may be used to store programs, data and the like and is typically a secondary storage medium such as a hard disk that is slower than memory. The mass storage device 608 can be used to hold a library or database of prepackaged logic or intellectual property functions, as well as information on generating particular configurations. It will be appreciated that the information retained within the mass storage device 608, may, in appropriate cases, be incorporated in standard fashion as part of memory component 606 as virtual memory. A specific mass storage device such as a CD-ROM 614 may also pass data uni-directionally to the CPU.

CPU 602 is also coupled to an interface 610 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 602 may be a design tool processor. Finally, CPU 602 optionally may be coupled to a computer or telecommunications network using a network connection as shown generally at 612. With such a network connection, it is contemplated that the CPU might receive information from the network, or might output information to the network in the course of performing the above-described process steps. It should be noted that the system 600 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. An apparatus comprising:
a first storage device implementing a first data table including a plurality of storage locations, each storage location capable of storing a compressed key generated by applying a first hash function to a key, each storage location having a respective address in the first data table, each address being associated with one or more indexes, each index capable of being generated by applying a second hash function to a key, wherein:
  each of the addresses of a first group of the storage locations is associated with a compressed index, each compressed index being a compressed representation of two or more indexes; and
  when provided with a compressed representation of a key during a lookup operation, the first storage device provides the address where the compressed representation of the key is stored if the compressed representation of the key is stored in the first data table;
a second storage device implementing a second data table including a plurality of storage locations, each storage location capable of storing a key, each storage location having a respective address in the second data table, each address being associated with one or more indexes, each index capable of being generated by applying a third hash function to a key, wherein:
  when provided with a key during a lookup operation, the second storage device provides the address where the key is stored if the key is stored in the second data table; and
one or more processing devices for performing a lookup operation including:
  receiving a key;
  generating a compressed representation of the received key using the first hash function;
  providing the compressed representation of the received key to the first storage device;
  providing the received key to the second storage device;
  receiving an address associated with the compressed representation of the received key from the first storage device;
  receiving an address associated with the received key from the second storage device;
  selecting an address received from the first and second storage devices, wherein when an address is received from the first storage device and an address is received from the second storage device, the address from the second storage device is selected; and
  providing the selected address to a result table that provides a data value based on the selected address.

2. The apparatus of claim 1, wherein each compressed index is generated by dropping a least significant bit from two or more of the indexes capable of being generated using the second hash function, or from two or more compressed indexes.

3. The apparatus of claim 1, further comprising a third storage device implementing a third data table including a plurality of storage locations, each storage location capable of storing a key, each storage location having a respective address in the third data table, each address being associated with a key, wherein:
  when provided with a key during a lookup operation, the third storage device provides the address where the key is stored if the key is stored in the third data table.

4. The apparatus of claim 3, wherein the lookup operation further includes:
providing the received key to the third storage device;
receiving an address associated with the received key from the third storage device;
selecting an address received from the first, the second and the third storage devices, wherein when an address is received from the first, the second and the third storage devices, the address from the third storage device is selected.

5. The apparatus of claim 4, wherein during the lookup operation, the received key is provided to the third storage device substantially in parallel with providing the received key to the second storage device and with providing the compressed representation of the received key to the first storage device.

6. The apparatus of claim 1, wherein during the lookup operation, the received key is provided to the second storage device substantially in parallel with providing the compressed representation of the received key to the first storage device.

7. The apparatus of claim 1, wherein:
the storage locations in the first data table are arranged in one or more columns, each of the columns including one or more rows, each row of each column being associated with a respective address in the first data table, a first of the columns being associated with the first group of storage locations;
there are two or more columns in the first data table;
the storage locations in the second data table are arranged in one or more columns, each of the columns including one or more rows, each row of each column being associated with a respective address in the second data table;
during the lookup operation, each of the columns in the first data table is searched substantially in parallel for the compressed representation of the key; and
when the compressed representation of the key is stored in more than one of the columns in the first data table, the address in the one of the columns associated with the least number of indexes is selected to be provided.

8. The apparatus of claim 7, wherein each row of a second column in the first table is associated with a single respective index, each of the addresses of the respective rows in the second column being the same as the respective index.

9. The apparatus of claim 7, wherein the one or more processing devices are further for performing a storage operation including:
receiving a key;
generating a compressed representation of the received key using the first hash function;
generating a first index for the received key using the second hash function;
generating a compressed index based on the first index; and
determining whether the compressed representation of the received key is stored in a storage location in the first data table associated with the compressed index, and
when it is determined that the compressed representation of the received key is not stored in a storage location associated with the compressed index, storing the compressed representation of the received key in the storage location associated with the compressed index, and
when it is determined that the compressed representation of the received key is stored in a storage location associated with the compressed index, determining whether the compressed representation of the received key is stored in a storage location of another column in the first data table associated with the first index, and
when it is determined that the compressed representation of the received key is not stored in a storage location associated with the first index, storing the compressed representation of the received key in the storage location of the other column associated with the first index.

10. The apparatus of claim 9, wherein the storage operation further includes, when it is determined that there are no empty storage locations in the first data table associated with the first index:
generating a second index for the received key using the third hash function;
determining whether the received key is stored in a storage location in the second data table associated with the second index, and
when it is determined that the received key is not stored in the storage location associated with the second index, storing the received key in the storage location associated with the second index, and
when it is determined that the received key is stored in the storage location associated with the second index, storing the received key in a storage location in a third data table associated with the received key.

11. The apparatus of claim 1, wherein the first hash function and the second hash function are the same hash function.

12. The apparatus of claim 1, wherein the second hash function and the third hash function are the same hash function.

13. The apparatus of claim 1, wherein:
the first storage device includes a first logic device;
the second storage device includes a second logic device; and
the one or more processing devices include one or more third logic devices.

14. The apparatus of claim 12, wherein the first logic device, the second logic device and the one or more third logic devices are implemented in a programmable logic device (PLD).

15. A method comprising:
maintaining a first data table including a plurality of storage locations, each storage location capable of storing a compressed key generated by applying a first hash function to a key, each storage location having a respective address in the first data table, each address being associated with one or more indexes, each index capable of being generated by applying a second hash function to a key, wherein each of the addresses of a first group of the storage locations is associated with a compressed index, each compressed index being a compressed representation of two or more indexes; and
maintaining a second data table including a plurality of storage locations, each storage location capable of storing a key, each storage location having a respective address in the second data table, each address being associated with one or more indexes, each index capable of being generated by applying a third hash function to a key;
receiving a key;
generating a compressed representation of the received key using the first hash function;
searching the first data table for the compressed representation of the received key;
searching the second data table for the received key;

receiving an address associated with the compressed representation of the received key in the first data table;
receiving an address associated with the received key in the second data table;
selecting an address from the received addresses, wherein when an address in the first data table is received and an address in the second data table is received, the address in the second data table is selected;
searching a result table for the selected address; and
providing a data value from the result table based on the selected address.

16. The method of claim 15, wherein each compressed index is generated by dropping a least significant bit from two or more of the indexes capable of being generated using the second hash function, or from two or more compressed indexes.

17. The method of claim 15, further comprising maintaining a third data table including a plurality of storage locations, each storage location capable of storing a key, each storage location having a respective address in the third data table, each address being associated with a key.

18. The method of claim 17, further comprising:
searching the third data table for the received key; and
receiving an address associated with the received key in the third data table; and
wherein when an address in the third data table is received, an address in the second data table is received, and an address in the first data table is received, the address in the third data table is selected.

19. The method of claim 18, wherein the first data table, the second data table and the third data table are searched in parallel.

20. The method of claim 15, wherein the first data table and the second data table are searched in parallel.

21. The method of claim 15, wherein:
the storage locations in the first data table are arranged in one or more columns, each of the columns including one or more rows, each row of each column being associated with a respective address in the first data table, a first of the columns being associated with the first group of storage locations;
the storage locations in the second data table are arranged in one or more columns, each of the columns including one or more rows, each row of each column being associated with a respective address in the second data table;
there are two or more columns in the first data table;
during the lookup operation, each of the columns in the first data table is searched substantially in parallel for the compressed representation of the key; and
when the compressed representation of the key is stored in more than one of the columns in the first data table, the address in the one of the columns associated with the least number of indexes is selected to be provided.

22. The method of claim 21, wherein each row of a second column in the first table is associated with a single respective index, each of the addresses of the respective rows in the second column being the same as the respective index.

23. The method of claim 21, further comprising performing a storage operation including:
receiving a key;
generating a compressed representation of the received key using the first hash function;
generating a first index for the received key using the second hash function;
generating a compressed index based on the first index; and
determining whether the compressed representation of the received key is stored in a storage location in the first data table associated with the compressed index, and
when it is determined that the compressed representation of the received key is not stored in a storage location associated with the compressed index, storing the compressed representation of the received key in the storage location associated with the compressed index, and
when it is determined that the compressed representation of the received key is stored in a storage location associated with the compressed index, determining whether the compressed representation of the received key is stored in a storage location of another column in the first data table associated with the first index, and
when it is determined that the compressed representation of the received key is not stored in a storage location associated with the first index, storing the compressed representation of the received key in the storage location of the other column associated with the first index.

24. The method of claim 23, wherein the storage operation further includes, when it is determined that there are no empty storage locations in the first data table associated with the first index:
generating a second index for the received key using the third hash function;
determining whether the received key is stored in a storage location in the second data table associated with the second index, and
when it is determined that the received key is not stored in the storage location associated with the second index, storing the received key in the storage location associated with the second index, and
when it is determined that the received key is stored in the storage location associated with the second index, storing the received key in a storage location in a third data table associated with the received key.

25. The method of claim 15, wherein the first hash function and the second hash function are the same hash function.

26. The method of claim 15, wherein the second hash function and the third hash function are the same hash function.

* * * * *